United States Patent [19]

Sweeney

[11] Patent Number: 4,732,467

[45] Date of Patent: Mar. 22, 1988

[54] AUTOMATED PHOTOGRAPH SLIDE STORAGE AND RETRIEVAL SYSTEM

[75] Inventor: Thomas P. Sweeney, Plymouth, Minn.

[73] Assignee: Modec Corporation, New Hope, Minn.

[21] Appl. No.: 883,358

[22] Filed: Jul. 8, 1986

[51] Int. Cl.$^4$ ............................................. G03B 23/00
[52] U.S. Cl. ..................................................... 353/25
[58] Field of Search ..................................... 353/15–19, 353/120, 121, 122, 27 R, 27 A, 25; 360/2; 40/158

[56] References Cited

U.S. PATENT DOCUMENTS

| | | | |
|---|---|---|---|
| 3,288,024 | 11/1966 | Cronquist | 353/118 X |
| 3,757,941 | 9/1973 | Anstin | 353/25 X |
| 3,800,942 | 4/1974 | Hirata | 353/25 |
| 3,807,851 | 4/1974 | Knox et al. | |
| 3,938,190 | 2/1976 | Semmlow et al. | |
| 3,943,563 | 3/1976 | Lemelson | 360/2 X |
| 4,014,604 | 3/1977 | Schwartz | |
| 4,204,754 | 5/1980 | Asanuma | 353/118 X |
| 4,302,776 | 11/1981 | Taylor et al. | |
| 4,376,610 | 3/1983 | Sofia | |
| 4,382,664 | 5/1983 | Karl et al. | |
| 4,385,816 | 5/1983 | Lamb | |
| 4,408,849 | 10/1983 | Sickles | |
| 4,459,015 | 7/1984 | Brecht | |
| 4,593,042 | 5/1986 | Lemelson et al. | |

FOREIGN PATENT DOCUMENTS

111108 7/1983 Japan .

Primary Examiner—Harry N. Haroian
Attorney, Agent, or Firm—Kinney & Lange

[57] ABSTRACT

An automated photograph slide storage and retrieval system adapted for use with photograph slides having a magnetic stripe with information characteristic of the slide encoded thereon. The system includes a storage and retrieval device and a terminal. The storage and retrieval device includes a plurality of magazines in which the photograph slides are stored at indexed locations, a pick mechanism for retrieving selected photograph slides from the magazines, a read head, and a computer for controlling the magazines and pick mechanism. Data representative of the indexed locations at which the photograph slides are stored is maintained within electronic memory of the terminal. Information representative of selected slides to be retrieved from or stored within the storage and retrieval device is entered into the terminal through a keyboard. In response, the terminal provides command signals to the computer of the storage and retrieval device thereby causing the selected slides to be stored or retrieved. Information read from the magnetic stripe on the slides is displayed on a monitor at the terminal.

31 Claims, 7 Drawing Figures

Fig. 2

AUTOMATED PHOTOGRAPH SLIDE STORAGE AND RETRIEVAL SYSTEM

BACKGROUND OF THE INVENTION

1. Field of the Invention

The present invention relates to apparatus for storing photograph slides. In particular, the present invention is a computer controlled mechanized slide storage and retrieval system.

2. Description of the Prior Art

Slide mounting is a very popular method for maintaining photographs. Many establishments such as commercial businesses and public museums have large libraries of photograph slides. As the size of these libraries increase, they can be extremely difficult to manage. Invariably, the need arises to access a particular slide within a minimum amount of time. There are usually certain slides which are frequently used and must be kept readily available. Performing these tasks is difficult with large slide libraries.

Currently available photograph slide storage and retrieval systems are primarily manual. Large filing cabinets are specifically designed for storing photograph slides. The slides must be placed within and removed from the file cabinets by hand. Information characteristic of the slides and their locations within the file cabinets is often maintained within a personal computer. Although an operator can identify a slide and its storage position through use of the personal computer, it must still be retrieved by hand from the file cabinet.

When a collection of slides exceeds 5000 or so in number, it becomes a labor-intensive task to physically maintain the library and file records thereto. These problems are compounded by the repetitive tasks of data entry and slide filing. This manual method also requires continuous handling of delicate and valuable slides. Long-term safekeeping, therefore, becomes difficult.

It is evident that there is a continuing need for improved photograph slide storage and retrieval systems. An automated slide storage and retrieval system would be especially desirable. The system must be compact, have a large storage capacity, and be easy to operate.

SUMMARY OF THE INVENTION

The present invention is an automated photograph slide storage and retrieval system. The system includes a storage and retrieval device, and terminal means. The storage and retrieval device includes storage means for storing photograph slides at indexed locations, retrieval means for retrieving the photograph slides from the storage means, and control means responsive to commann signals for controlling the retrieval means. The terminal means includes memory means for storing location data representative of the indexed locations at which the photograph slides are stored. Data representative of photograph slides to be retrieved is entered into the terminal means. In response, the terminal means provides command signals representative of the photograph slides to be retrieved to the control means of the storage and retrieval device.

In a preferred embodiment, the storage means includes a plurality of movable magazines for storing the photograph slides. The retrieval means includes magazine drive means responsive to the control means for driving the magazines, and a pick mechanism for picking photograph slides from the magazines. A first pick mechanism drive means which is responsive to the control means drives the pick mechanism relative to individual magazines, and positions the pick mechanism adjacent desired photograph slides. The retrieval means also includes a second pick mechanism drive means responsive to the control means for driving the pick mechanism between the magazines, and for positioning the pick mechanism adjacent a desired magazine.

In still other embodiments, the storage and retrieval system is adapted to store photograph slides with electronically readable information encoded thereon. The storage and retrieval device further includes read head means for reading encoded information from the photograph slides. This information is displayed on a screen at the terminal means.

DETAILED DESCRIPTION OF THE PREFERRED EMBODIMENTS

Figure 1:
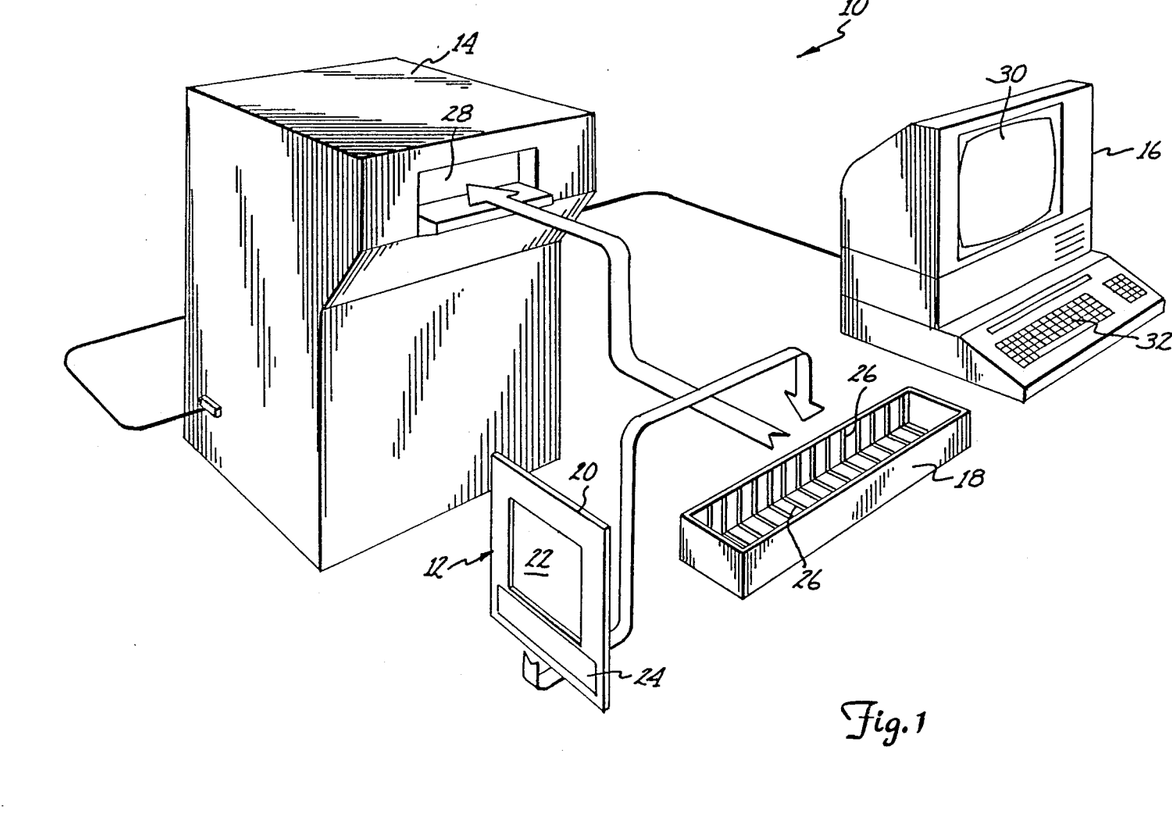
FIG. 1 is a view illustrating the photograph slide storage and retrieval system of the present invention.

Automated photograph slide storage and retrieval system 10 of the present invention is illustrated generally in FIG. 1. Storage and retrieval system 10 is adapted for use with photograph slides 12, and includes a storage and retrieval device 14, terminal 16, and slide serving tray 18. Large numbers of photograph slides 12 can be conveniently stored, yet quickly and accurately accessed and retrieved through the use of system 10. As a result, the management of large photograph slide libraries is greatly simplified.

Photograph slide 12 is formed by a slide mount 20 which has an opening 22 adapted to receive a piece of photographic film (not shown) with an image thereon. Photograph slides of this type are well known and in widespread use. Photograph slide 12 can be of any desired size for holding any of a wide variety of types of photographic film. In one embodiment, system 10 is designed for the storage and retrieval of standard 35 mm photograph slides.

In the preferred embodiment shown in FIG. 1, photograph slide 12 includes a medium such as magnetic stripe 24 for storing electronically readable alphanumeric information. Information such as a slide identification number, a description of the image, or storage data, can be encoded onto magnetic stripe 24. Alternatively, data of these or other types can be machine readable printed characters or encoded onto an optical bar code medium. An information encoded photograph slide 12 such as that shown in FIG. 1 is described in greater detail in application Ser. No. 866,214 entitled DIGITALLY ENCODED ALPHA-NUMERIC PROJECTOR SLIDE AND SYSTEMS FOR USING THE SAME, filed May 22, 1986, and assigned to the same assignee as the present invention.

Slide serving tray 18 is adapted to hold a plurality of photograph slides 12 which are to be stored within or retrieved from storage and retrieval device 14. In the embodiment shown, serving tray 18 includes a plurality of slots 26 which hold photograph slides 12 in a parallel relationship to one another at spaced-apart locations. Although slide tray 18 shown in FIG. 1 holds photograph slides 12 in a linear configuration, well known ring-shaped carousel slide serving trays can also be used.

Storage and retrieval device 14 includes a serving window 28 through which serving tray 18 is inserted and removed. Photograph slides 12 which are to be stored within storage and retrieval device 14 can be inserted by hand into serving tray 18, and serving tray 18 positioned within serving window 28. In response to store command signals from terminal 16, storage and retrieval device 14 will remove photograph slides 12 from serving tray 18, and store the slides at indexed locations therein. When particular photograph slides 12 are to be retrieved, storage and retrieval device 14 removes the slides from their indexed storage locations in response to retrieve command signals from terminal 16, and positions them within serving tray 18.

Terminal 16 is used to control storage and retrieval device 14 and includes display screen 30, keyboard 32, and electronic memory (not separately shown). Data representative of specific slides 12 to be retrieved from or stored within storage and retrieval device 14 is entered into terminal 16 through keyboard 32. Information so entered, or information read from magnetic stripe 24 of photograph slides 12, can be displayed on screen 30. Data representative of the indexed locations at which all photograph slides 12 are stored within storage and retrieval device 14 is maintained within the electronic memory of terminal 16.

Figure 2:
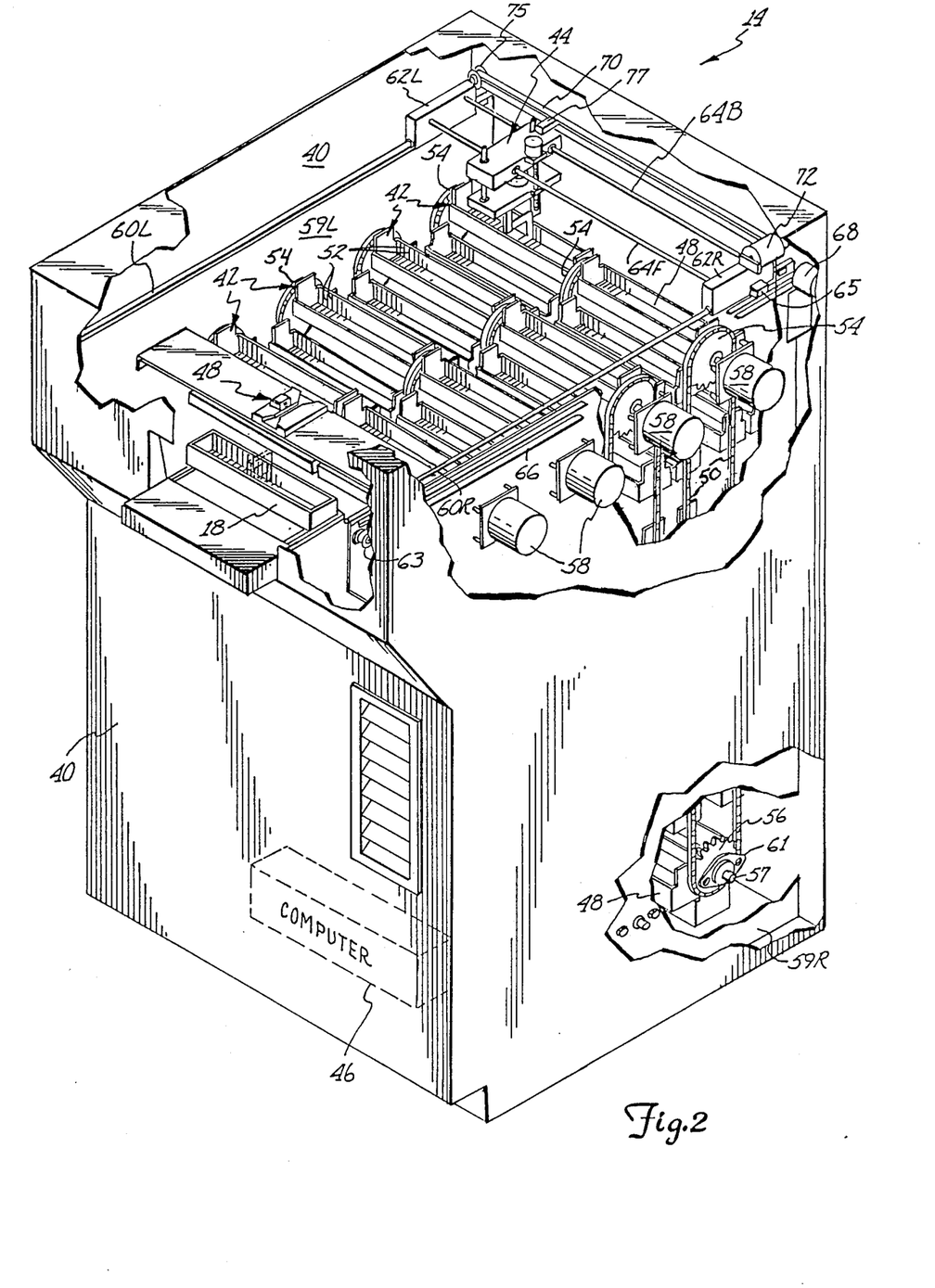
FIG. 2 is a detailed view of the slide storage and retrieval device shown in FIG. 1, with parts thereof shown in section.
Figure 3:
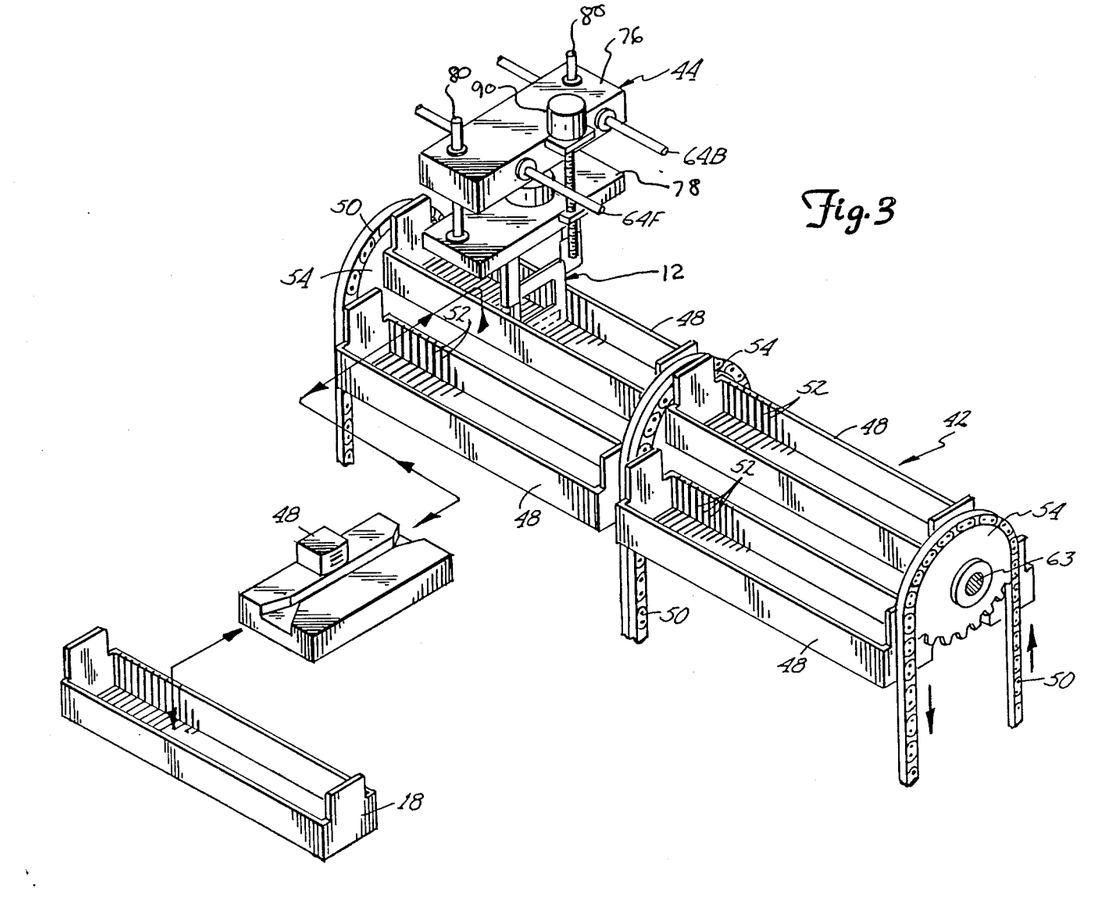
FIG. 3 is a detailed view illustrating parts of the storage and retrieval device shown in FIG. 2.

Mechanical and electro-mechanical elements of storage and retrieval device 14 are illustrated in greater detail in FIGS. 2 and 3. Mounted within cabinet 40 are a plurality of magazines 42, slide pick mechanism 44, a controller such as computer 46, and read head 48. In the embodiment shown, each magazine 42 is formed by a plurality of storage trays 48, three upper sprockets 54, three lower sprockets 56, linkages such as belts or chains 50, and a drive motor 58. As shown in FIG. 3, storage trays 48 include slots 52 which are adapted to receive photograph slides 12. Slots 52 maintain photograph slides 12 in a parallel relationship at spaced-apart locations along a longitudinal axis of storage trays 50.

Lower sprockets 56 (only one is shown in FIG. 2) are mounted to lower axle 57 at spaced-apart locations. Lower axle 57, in turn, is rotatably mounted within cabinet 40 to supporting walls 59R and 59L by means of bearing brackets 61 (only one is shown in FIG. 2). In a similar manner, upper sprockets 54 of each magazine 42 are mounted to upper axles 63. One end of each axle 63 is rotatably mounted to supporting wall 59L, while the opposite end is coupled to motor 58. Motor 58 is mounted to supporting wall 59R. For each magazine 42 of the embodiment shown in FIG. 2, upper axles 63 are positioned directly above and parallel to their associated lower axles 57.

Chain linkages 50 couple each associated upper sprocket 54 and lower sprocket 56 of each magazine 42. A plurality of storage trays 48 are pivotally suspended from linkages 50. In response to magazine drive control signals from computer 46, drive motors 58 will rotate upper axles 63, thereby raising and lowering storage trays 48 until a desired storage tray is presented at the top of magazine 42 at an access position within reach of pick mechanism 44.

Pick mechanism 44 can be driven under the control of computer 46 in both a first direction along an X-axis defined by the longitudinal axis of slide storage trays 48, and in a second direction along a Y-axis between magazines 42. A Y-axis drive system includes Y-axis guide rods 60R and 60L which are mounted parallel to and above supporting walls 59R and 59L, respectively. Slidably mounted to rods 60R and 60L are Y-axis drive blocks 62R and 62L, respectively. Pick mechanism 44, in turn, is slidably mounted to a pair of X-axis guide rods 64F and 64B which form part of an X-axis drive system. Guide rods 64F and 64B are both mounted between drive blocks 62R and 62L, and are oriented in a generally parallel direction with respect to the longitudinal axis of storage trays 48.

The Y-axis drive system also includes Y-axis drive linkage 66, Y-axis drive motor 68, bearing 63, and coupler 65. Bearing 63 is rotatably mounted near one end of a guide rod 60R, while Y-axis drive motor 68 is mounted near the opposite end. Y-axis drive linkage 66 is positioned along the length of a Y-axis guide rod 60R with one end looped around bearing 63 and the opposite end looped around a drive shaft (not separately shown) of Y-axis drive motor 68. Linkage 66 is coupled to drive block 62R by coupler 65. In response to Y-axis drive signals from computer 46, motor 68 will drive pick mechanism 44, through linkage 66, along guide rods 62R and 62L between magazines 42.

The X-axis drive system similarly includes X-axis drive linkage 70, X-axis drive motor 72, bearing 75 and coupler 77. Bearing 75 is rotatably mounted to Y-axis drive block 62L near one end of X-axis guide rod 64B, while X-axis drive motor 72 is mounted to Y-axis drive block 62R near an opposite end of rod 64B. X-axis drive linkage 70 is positioned along the length of and adjacent to X-axis guide rod 64B, with one end looped around bearing 75 and the opposite end looped around a drive shaft (not separately shown) of X-axis drive motor 72. Linkage 70 is coupled to pick mechanism 44 by coupler 77. In response to X-axis drive signals received from computer 46, X-axis drive motor 72 will drive pick mechanism 44, through linkage 70, along storage trays 48 of magazines 42.

Pick mechanism 44 is described in greater detail with reference to FIGS. 4–6. Included is a carriage 77 formed by upper carriage member 76 and lower carriage member 78. Upper carriage member 76 is slidably mounted to X-axis guide rods 64F and 64B to permit pick mechanism 44 to be driven with respect to the rods. Lower carriage member 78 is fixedly mounted to vertical guide rods 80, which in turn are slidably fit through bores (not shown) of upper carriage member 76. Also mounted to upper carriage member 76 is a vertical drive motor 90 which is interfaced to computer 46 through cables 91. Motor 90 has a threaded shaft 92 which is fit in a threaded bore within lower carriage member 78. In response to vertical drive signals from computer 46, vertical drive motor 90 will rotate threaded shaft 92 thereby raising and lowering lower carriage member 78 with respect to upper carriage member 76.

Anvil 96 is fastened to an extends from a lower side of one end of lower carriage member 78. Finger mechanism 98 is pivotally mounted to the lower side of lower carriage member 78 near an end opposite that of anvil 96 by means of pivot assembly 91. Finger mechanism 98 includes a finger 100 which extends generally vertically downward, and integral lever arm 102 which is oriented generally parallel to lower carriage member 78. Mounted to a lower edge of finger 100 and side facing anvil 96 is knife edge 110. Finger 100 is biased toward anvil 96 by spring 112. Solenoid 104 is mounted to an upper surface of lower carriage member 78, and is interfaced to computer 46 through cables 105. An actuator arm 106 extends through solenoid 104 and has a lower end which contacts lever arm 102. An upper end of actuator arm 106 is terminated with stop 108.

Figures 4, 5, 6:
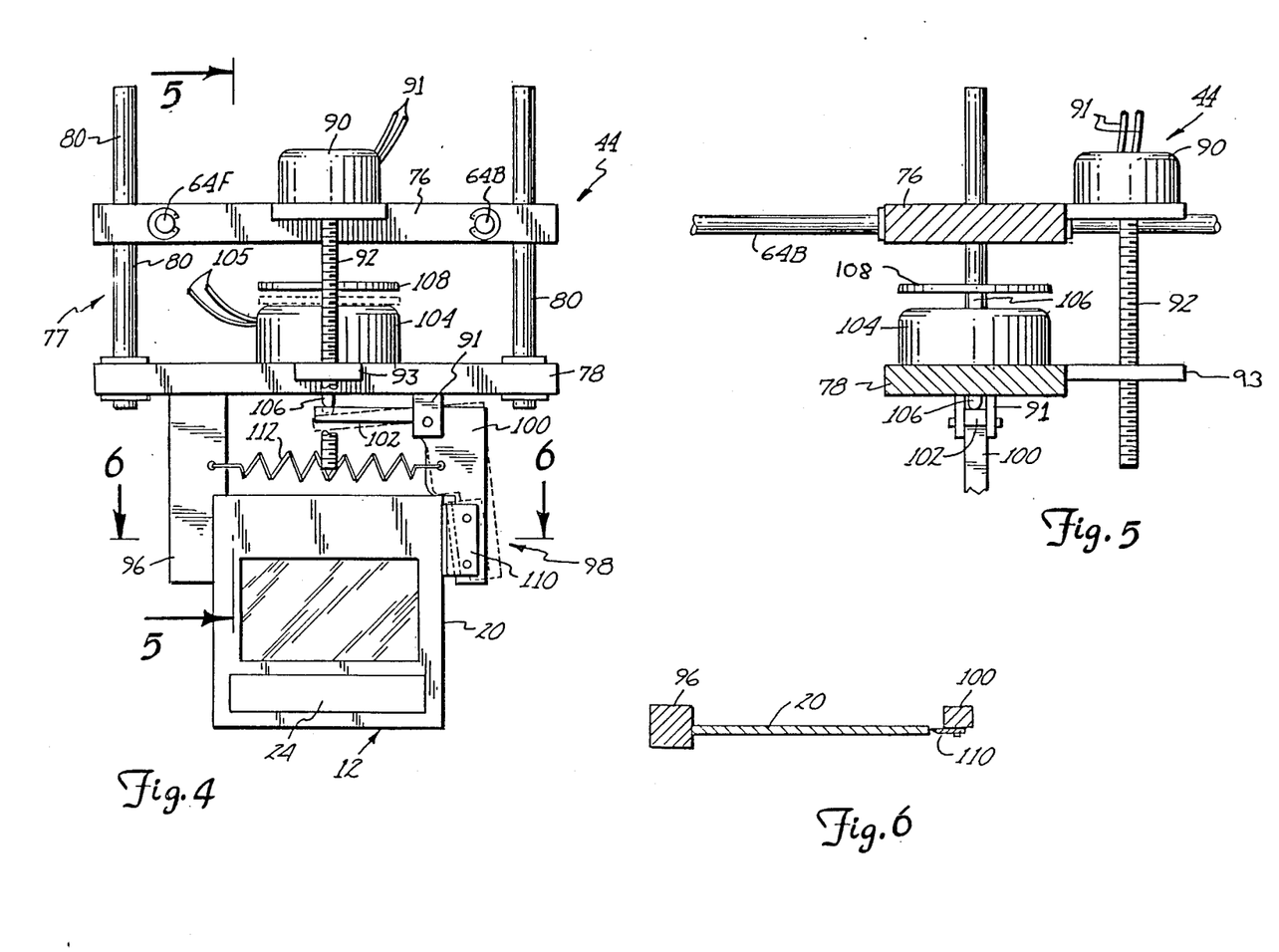
FIG. 4 is a detailed view of the pick mechanism shown in FIG. 2.
FIG. 5 is a sectional view of the pick mechanism shown in FIG. 4, taken along lines 5—5.
FIG. 6 is a sectional view of the pick mechanism shown in FIG. 4, taken along lines 6—6.

In response to solenoid drive signals from computer 46, solenoid 104 will be actuated forcing shaft 106 against lever arm 102, thereby driving finger 100 to an open position (indicated in dashed lines in FIG. 4). When lower carriage member 78 is lowered so as to position anvil 96 adjacent a desired photograph slide 12, solenoid 104 is deactivated, with knife edge 110 being forced against frame 20 of photograph slide 12 by spring 112. Vertical drive motor 90 can then be actuated to raise photograph slide 12, permitting it to be moved as desired by carriage 44.

Figure 7:
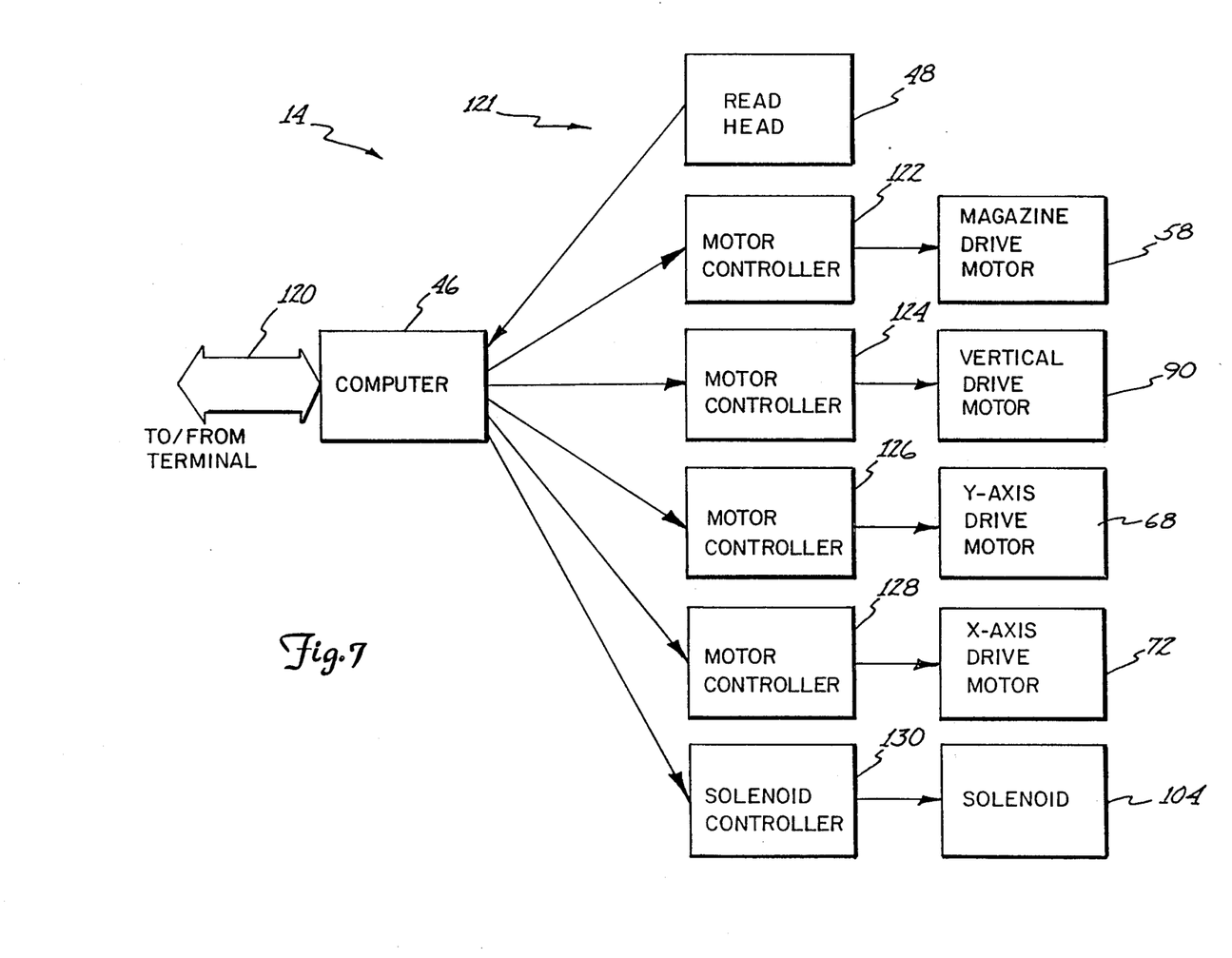
FIG. 7 is a block diagram representation of an electrical subsystem of the storage and retrieval device shown in FIG. 2.

An electrical subsystem 121 of storage and retrieval device 14 is illustrated in FIG. 7. As shown, computer 46 is interfaced to terminal 16 through data bus 120. Read head 48 is interfaced directly to computer 46. Drive motors 58, 90, 68 and 72 are interfaced to computer 46 through motor controllers 122, 124, 126 and 128, respectively. Computer 46 is interfaced to solenoid 104 through solenoid controller 130. The operation of electrical subsystems such as 121 is well known.

Operation of storage and retrieval system 10 is best described with reference to FIGS. 2-3. Photograph slides 12 can be loaded into device 14 in one of several ways. When a relatively small number of photograph slides 12 must be loaded, they can be placed within serving tray 18 which is in turn positioned within serving window 28. An operator will then enter information representative of the indexed locations (e.g. magazine, tray ansd slot) at which it is desired to store photograph slides 12. This information is stored within the memory of terminal 16.

Once the location data has been entered, terminal 16 will generate store commands which are provided to computer 46 of storage and retrieval device 14. In response, computer 46 will produce a variety of drive signals including magazine drive signals which cause the particular magazine 42 to be rotated to position the desired storage tray 48 in which the slide 12 is to be stored at a point (e.g. at the top) at which it can be accessed by pick mechanism 44. Drive signals are also provided to X-axis and Y-axis drive motors 72 and 68, respectively, causing pick mechanism 44 to be positioned over the desired photograph slide 12 in serving tray 18.

Computer 46 then generates vertical drive motor and solenoid drive signals causing pick mechanism 44 to remove photograph slide 12 from serving tray 18. After the desired photograph slide 12 is removed from serving tray 18, X-axis and Y-axis drive motors 68 and 72, respectively, are again actuated by computer 46 to return pick mechanism 44 to slot 52 of storage tray 48 in which the slide is to be stored. While so doing, pick mechanism 44 passes magnetic stripe 24 of photograph slide 12 by read head 48, as shown in FIG. 3, so that information encoded thereon can be displayed on display screen 30 of terminal 16. This information can also be used by an operator to ensure that slide 12 is being positioned within the proper indexed location. Finally, computer 46 generates control signals causing pick mechanism 44 to position photograph slide 12 into the desired slot 52.

When many slides 12 must be positioned within device 14, a cover (not separately shown) can be removed, permitting access to magazines 42. Photograph slides 12 can then be quickly loaded into storage trays 48 by hand. Once photograph slides 12 are loaded in this manner, storage and retrieval device 14 can be commanded through terminal 16 to perform an inventory of their locations. When conducting this inventory procedure, computer 46 causes pick mechanism 44 to remove each photograph slide 12 from storage trays 48, pass its magnetic stripe 24 by read head 48, and return the slide to its storage tray. In this manner, each photograph slide 12 can be identified, and data representative of the indexed location at which it is stored can be maintained within the electronic memory of terminal 16.

To retrieve photograph slides 12 from storage and retrieval device 14, information representative of the slides (e.g. their ID number) is entered through terminal 16. Data representative of the indexed locations at which the slides 12 are stored is then provided to computer 46. In response, computer 46 generates drive signals which cause pick mechanism 44 to retrieve the slides 12 from the particular locations with magazines 48, and to position them within serving tray 18. Magnetic stripe 24 of the photograph slide 12 can be passed by read head 48 in the course of this motion, and the encoded information read therefrom displayed on screen 30.

Although the present invention has been described with reference to preferred embodiments, workers skilled in the art will recognize that changes may be made in form and detail without departing from the spirit and scope of the invention.

What is claimed is:

1. An automated photograph slide storage and retrieval system for use with photograph slides of the type having electronically readable information encoded thereon, including:
   a plurality of movable magazines for storing a plurality of photograph slides at indexed locations;
   magazine drive means for driving the magazines;
   pick means for picking selected photograph slides from the magazines;
   first pick drive means for driving the pick means with respect to the plurality of magazines, and for positioning the pick means adjacent selected magazines;
   second pick drive means for driving the pick means with respect to selected magazines, and for positioning the pick means adjacent selected photograph slides;
   memory means for storing data representative of the indexed locations at which the photograph slides are stored;
   operator interface means for receiving information representative of photograph slides to be retrieved;
   read head means for reading information from the photograph slides; and control means coupled to the memory means, pick means, read head means, operator interface means, magazine drive means and the first and second pick drive means, for controlling the magazine drive means, pick means and first and second pick drive means and causing selected photograph slides to be retrieved from the magazines.

2. The storage and retrieval system of claim 1 wherein the magazines include slide storage trays in which the photograph slides are stored.

3. The storage and retrieval system of claim 2 wherein the slide storage trays include slots adapted to receive the photograph slides for holding the slides at spaced-apart locations.

4. The storage and retrieval system of claim 1 wherein the movable magazines include:
   at least one first sprocket rotatably mounted about a first axis within the storage and retrieval system;
   at least one second sprocket rotatably mounted about a second axis within the storage and retrieval system, wherein the second axis is parallel to and spaced apart from the first axis, and each second sprocket is associated with a first sprocket;
   linkages coupling associated first and second sprockets; and
   a plurality of slide storage trays pivotally suspended from the linkages.

5. The storage and retrieval system of claim 1 and further including a serving window at which the retrieved slides are presented.

6. The storage and retrieval system of claim 5 wherein:
   the operator interface means includes means for receiving data representative of indexed locations at which photograph slides are to be stored; and
   the control means includes means for causing photograph slides presented at the serving window to be stored in the magazines at the indexed locations.

7. The storage and retrieval system of claim 6 and further including a slide serving tray adapted to be positioned within the serving window, and wherein the control means includes means for causing retrieved slides to be placed in the serving tray, and for causing slides to be stored to be removed from the serving tray.

8. The storage and retrieval system of claim 1 wherein:
   the system is adapted to store photograph slides with information magnetically encoded thereon; and
   the read head means includes a magnetic read head.

9. The storage and retrieval system of claim 1 and further including display monitor means coupled to the read head means for providing a visual display of the information read from the photograph slides.

10. The storage and retrieval system of claim 1 wherein the operator interface means includes a keyboard.

11. An automated photograph slide storage and retrieval system for use with photograph slides of the type having electronically readable information encoded thereon, the system comprising:
   a storage and retrieval device, including:
      a plurality of movable magazines for storing a plurality of photograph slides at indexed locations;
      magazine drive means for driving the magazines;
      pick means for picking selected photograph slides from the magazines;
      first pick drive means for driving the pick means with respect to the plurality of magazines, and for positioning the pick means adjacent selected magazines;
      second pick drive means for driving the pick means with respect to selected magazines, and for positioning the pick means adjacent selected photograph slides;
      read head means for reading encoded information from the photograph slides; and
      control means responsive to command signals for controlling the magazine drive means, pick means, first pick drive means, and second pick drive means, and causing selected photograph slides to be retrieved from the magazines; and
   a terminal coupled to the control means and read head means for interfacing an operator to the storage and retrieval device, including:
      a keyboard for receiving data representative of photograph slides to be retrieved;
      memory means for storing location data representative of the indexed locations at which the photograph slides are stored; and
      display monitor means for providing a visual display of information read from the photograph slides.

12. The storage and retrieval system of claim 11 wherein the magazines include slide storage trays in which the photograph slides are stored.

13. The storage and retrieval system of claim 12 wherein the slide storage trays include slots adapted to receive the photograph slides for holding the slides at spaced-apart locations.

14. The storage and retrieval system of claim 11 wherein the movable magazines include:
   a plurality of first sprockets rotatably mounted about a first axis within the storage and retrieval device;
   a plurality of second sprockets rotatably mounted about a second axis within the storage and retrieval device, wherein the second axis is parallel to and spaced apart from the first axis, and each second sprocket is associated with one of the first sprockets;
   linkages coupling associated first and second sprockets; and
   a plurality of slide storage trays pivotally suspended from the linkages.

15. The storage and retrieval system of claim 14 wherein the slide storage trays include slots for holding the photograph slides at spaced-apart locations.

16. The storage and retrieval system of claim 11 wherein the storage and retrieval device includes a serving window at which the retrieved slides are presented.

17. The storage and retrieval system of claim 16 wherein:
   the terminal means includes means for receiving data representative of indexed locations at which photograph slides are to be stored, and provides command signals representative thereof to the control means; and
   the control means includes means for causing photograph slides presented at the serving window to be stored at indexed locations in the magazines.

18. The storage and retrieval system of claim 17 and further including a slide serving tray adapted to be positioned within the serving window, wherein the control means includes means for causing retrieved slides to be placed in the serving tray, and for causing slides to be stored to be withdrawn from the serving tray.

19. The storage and retrieval system of claim 11 wherein:
the system is adapted to store photograph slides with information magnetically encoded thereon; and
the read head means includes a magnetic read head.

20. An automated photograph slide storage and retrieval system for use with photograph slides of the type having electronically readable information encoded thereon, including:
storage means for storing photograph slides at indexed locations;
a serving window;
pick means for retrieving selected photograph slides from the storage means and presenting the selected slides at the serving window, and for storing photograph slides presented at the serving window at indexed locations;
memory means for storing data representative of the indexed locations at which photograph slides are stored;
operator interface means for receiving information representative of photograph slides to be retrieved, and indexed locations at which photograph slides are to be stored;
read head means for reading information from the photograph slides; and
control means coupled to the pick means, memory means, read head means and operator interface means for controlling the pick means.

21. The storage and retrieval system of claim 20 and further including display monitor means for providing a visual display of information read from the photograph slides.

22. The storage and retrieval system of claim 20 wherein the operator interface means includes a keyboard.

23. The storage and retrieval system of claim 20 wherein the storage means includes slide storage trays in which the photograph slides are stored.

24. the storage and retrieval system of claim 23 wherein the slide storage trays include slots adapted to receive the photograph slides for holding the slides at spaced-apart locations.

25. The storage and retrieval system of claim 20 wherein:
the storage means includes:
a movable magazine for storing a plurality of photograph slides; and
the retrieval means includes:
magazine drive means responsive to the control means for driving the magazine; and
a pick mechanism for picking selected photograph slides from the magazine.

26. The storage and retrieval system of claim 25 wherein the retrieval means further includes a first pick mechanism drive means responsive to the control means for driving the pick mechanism relative to the magazine, and for positioning the pick mechanism adjacent selected photograph slides.

27. The storage and retrieval system of claim 26 wherein:
the storage means further includes:
a plurality of movable magazines; and
the retrieval means further includes:
magazine drive means responsive to the control means for driving each of the magazines; and
second pick mechanism drive means responsive to the control means for driving the pick mechanism relative to the plurality of magazines, and for positioning the pick mechanism adjacent a selected magazine.

28. The storage and retrieval system of claim 27 wherein the movable magazines include:
at least one first sprocket rotatably mounted about a first axis within the storage and retrieval system;
at least one second sprocket rotatably mounted about a second axis within the storage and retrieval system, wherein the second axis is parallel to and spaced apart from the first axis, and each second sprocket is associated with a first sprocket;
linkages coupling associated first and second sprockets; and
a plurality of slide storage trays pivotally suspended from the linkages.

29. The storage and retrieval system of claim 28 wherein the slide storage trays include slots for holding the photograph slides at spaced-apart locations.

30. The storage and retrieval system of claim 20 and further including a slide serving tray adapted to be positioned within the serving window, and wherein the retrieval means includes means for placing retrieved slides in the slide serving tray, and for withdrawing slides to be stored from the serving tray.

31. The storage and retrieval system of claim 20 wherein:
the system is adapted to store photograph slides with information magnetically encoded thereon; and
the read head means includes a magnetic read head.

* * * * *